United States Patent Office 2,939,845
Patented June 7, 1960

2,939,845
POLYMERIZATION CATALYST

Gelu Stoeff Stamatoff, Newark, Del., assignor to E. I. du Pont de Nemours and Company, Wilmington, Del., a corporation of Delaware No Drawing. Filed Sept. 13, 1957, Ser. No. 683,709

1 Claim. (Cl. 252—429)

The present invention relates to novel organometallic compounds and more particularly to novel polymerization catalysts useful in the polymerization of ethylene.

In accordance with the present invention a highly reactive polymerization catalyst is formed when a titanium halide is admixed with an organometallic complex obtained from an equimolar mixture of an aluminum trialkyl and a magnesium diaryl. It has heretofore been known that reaction products formed by admixing titanium halides with organometallic compounds such as metal alkyls are active polymerization catalysts for terminally unsaturated hydrocarbon compounds such as ethylene, propylene, butene-1, etc. The most active catalyst, i.e. those catalysts which give rise to the largest amount of polymer for the same quantity of catalyst, are formed by the reaction of titanium tetrachloride and aluminum trialkyls and particularly such aluminum trialkyls as aluminum triisobutyl or aluminum triethyl. It has now been found that the activity of this catalyst can be significantly increased by employing a complex of an aluminum trialkyl and magnesium diaryl.

Investigation of mixtures of an aluminum trialkyl and a magnesium diaryl showed that at equimolar proportions a complex is formed between the two organometallic compounds. This complex has the general structure ArMg(AlR$_3$Ar) where R is an alkyl radical and Ar is an aryl radical. If additional aluminum trialkyl is added to this complex a second complex is formed at a molar ratio of 1:2 of magnesium diaryl to aluminum trialkyl, this complex has the general structure Mg(AlR$_3$Ar)$_2$. The use of the latter complex, although active in the formation of catalysts by reaction with titanium halide gives rise to catalysts lower in activity than catalysts obtained from MgAr(AlR$_3$Ar) or aluminum trialkyls alone. The above described organometallic complexes are formed by admixing the aluminum trialkyl and magnesium diaryl in the presence of an inert hydrocarbon solvent at room temperature in the absence of oxygen, moisture and hydroxyl groups containing compounds. Preferably one or both of the components are employed in the form of solutions. Due to their instability the isolation of these complexes is difficult. However, due to their ready formation when admixed in the proper proportions, the existence of these complexes is readily established by standard thermometric and conductometric titrations. Additional evidence for the formation of the 1:1 complex is that it forms a unique red solution when reacted with titanium tetrachloride in the presence of ethylene; that the complex is soluble in cyclohexane or heptane, whereas magnesium diaryls are not, and that aluminum trialkyls can not be distilled from an equimolar mixture of aluminum trialkyls and magnesium diaryls at temperatures above the boiling point of the aluminum trialkyl, although the aluminum trialkyl by itself can be distilled at the same temperatures. Magnesium diaryls useful in the formation of the novel organometallic complexes of the present invention include diphenyl magnesium, ditolyl magnesium, dixylyl magnesium, dinapthyl magnesium. Aluminum trialkyls suitable in the formation of the novel organometallic complex include aluminum trimethyl, aluminum triethyl, aluminum tripropyl, aluminum triisobutyl, aluminum trioctyl, aluminum tridodecyl, etc.

The catalyst is formed by the admixing of the 1:1 aluminum magnesium organometallic complex with the titanium halide in the presence of an inert hydrocarbon solvent at room temperature or elevated temperature. The titanium halides include the chlorides, bromides, iodides and fluorides of titanium. On admixing the two components of the catalyst the organometallic component reacts with the titanium halide to form a complex which contains titanium in a valence state below three. The reduced titanium is believed to coordinate with ethylenically unsaturated monomers and thereby cause the polymerization of such monomers. The formation of the catalyst is preferably carried out by admixing solutions of the catalyst components in inert hydrocarbon solvents, since such assures a more uniform and complete reaction of the components to form the catalyst. The catalyst components may be admixed in a wide range of molar ratios. In general, the ratio of the components is such that the quantity of the organometallic complex is sufficient to reduce the titanium to a valence state below three. Thus a suitable range of catalyst component ratios of the organometallic complex to the titanium halide is from 0.3 to 10. Particularly preferred ratios are from 1 to 3. A large excess of the organometallic complex is avoided since it does not aid in increasing the reactivity of the resulting catalyst. The catalyst may be formed prior to polymeriztion or may be formed in the presence of the monomer. Catalyst formation occurs on admixing the components at room temperature or at elevated temperature provided the solvent remains liquid.

The catalyst is suitably employed in the polymerization of ethylene in the presence of an inert hydrocarbon solvent such as n-heptane, cyclohexane, decene, benzene, toluene mineral oils, Fischer-Tropsch oils and similar hydrocarbon solvents. For practical purposes of solvent recovery after polymerization, the polymerization solvent is the same as the one selected for the formation of the catalyst. Polymerization occurs over a wide range of conditions. Thus a polymer slurry may be formed at room temperature and atmospheric pressure by simply passing ethylene through a hydrocarbon solvent containing the catalyst. The polymerization may also be carried out at elevated temperatures up to 300° C. and high pressures such as 100 to 200 atmospheres if desired. The polymerization is preferably carried out in the substantial absence of oxygen, moisture and hydroxyl containing compounds, since these compounds attack and decompose organometallic structures.

The present invention is further illustrated by the following examples.

*Example I*

Into a 500 ml. flask equipped with stirrer, condenser and gas inlet and outlet means was charged under an atmosphere of ethylene 100 ml. of decahydronaphthalene. The reactants were agitated and heated to 100° C., which temperature was maintained throughout the polymerization. The quantity of titanium tetrachloride set forth in the table below was injected into the reaction medium. This was followed by the injection of solution of aluminum-magnesium complex in decahydronaphthalene in the quantities indicated below. The complex was obtained by admixing diphenyl magnesium and aluminum triisobutyl in equimolar quantities in the presence of decahydronaphthalene. The addition of the organometallic complex initiated the polymerization. The ethylene polymerized was replenished so as to carefully maintain a pressure of 1 atmosphere. The amount of ethylene added to the reaction system was measured. The polymerization was stopped after 120 minutes. The reaction mixture was cooled to room temperature and poured into an excess of quantity of methanol. A white solid polymer of ethylene was obtained in the quantities indicated. The experiments were repeated with aluminum triisobutyl and magnesium diphenyl separately. The following results were obtained.

| Catalyst Components | quantity in micromoles | Ethylene polymerized in cc. after— | | g. of polymer |
|---|---|---|---|---|
| | | 10 mins. | 120 mins. | |
| titanium tetrachloride | 32 | 975 | 2,450 | 2.58 |
| diphenyl magnesium | 46 | | | |
| aluminum triisobutyl | 46 | | | |
| titanium tetrachloride | 32 | 750 | 2,140 | 2.35 |
| aluminum triisobutyl | 115 | | | |
| titanium tetrachloride | 32 | 440 | 985 | 1.1 |
| diphenyl magnesium | 64 | | | |

Example II

A cyclohexane-ethylene mixture containing 20% ethylene was charged continuously at the rate of 8.75 lbs./hour to a 1 l. autoclave agitated with a single paddle agitator at 5000 r.p.m. To the autoclave was added simultaneously the catalyst mixture prepared by mixing continuously a cyclohexane solution of titanium tetrachloride and a solution of a phenyl magnesium aluminum triisobutylphenyl complex in a molar ratio of the titanium to the aluminum-magnesium complex of 0.5. The aluminum magnesium complex was prepared by admixing a solution of aluminum triisobutyl in cyclohexane with magnesium diphenyl in a molar ratio of 1. The catalyst concentration in the autoclave at any time was maintained at a concentration of 0.1 millimole of titanium tetrachloride per liter of cyclohexane ethylene mixture. The autoclave temperature was maintained at 230° C. and the autoclave pressure at 2000 p.s.i.g. The polymer separated from the discharged reaction mixture was washed with methanol and dried. The resulting polyethylene was found to have a melt index of 0.5 as determined by ASTM-D-1238-52T, a density of 0.954, a methyl content of 0.6 per 100 carbon atoms in the main chain and a vinyl unsaturation of 1.4 per 2000 carbon atoms, the latter two determinations being obtained from infrared absorption spectra of films made from the polymer. The catalyst efficiency was 3500 lbs. of polymer per 1 lb. of titanium tetrachloride.

Example III

Into a 1 liter flask equipped with stirrer, reflux condenser, gas inlet and outlet means was charged under an atmosphere of ethylene 500 ml. of cyclohexane and 50 g. of dicyclopentadiene. The mixture was agitated until a saturated solution of ethylene was formed. To the reaction mixture was then added 0.01 mole of aluminum triisobutyl and 0.01 mole of magnesium diphenyl. The reaction mixture was stirred for several minutes. No precipitate formed. On addition of 0.005 mole of titanium tetrachloride a dark precipitate formed and polymerization was initiated. The polymerization was continued for 15 minutes at a temperature of 30 to 70° C. and atmospheric ethylene pressure. A thick polymer slurry was formed. The reaction mixture was poured into excess methanol filtered and dried. A copolymer of ethylene and dicyclopentadiene weighing 32 g. capable of being molded into a tough, stiff film, containing 27 weight percent of dicyclopentadiene as determined by infrared analysis was obtained.

The examples have shown the high catalytic activity obtained with the novel organometallic complexes obtained from magnesium diaryls and aluminum trialkyls. The examples have shown this increased catalytic activity of the catalysts of the present invention in the polymerization of ethylene. The catalysts are similarly useful in the homo- and copolymerization of higher terminally unsaturated olefins such as proylene, butene-1, isobutylethylene, pentene-1 and similar homologues, as well as in the polymerization of cyclic monomers and dienes.

The catalysts of the present invention are useful in obtaining high molecular weight polymers from terminally unsaturated hydrocarbon monomers. The catalysts of the present invention have higher activities than the best organometallic catalysts made heretofore, and thus are of outstanding value in the production of hydrocarbon polymers of higher efficiencies and lower cost.

I claim:

A catalyst composition comprising the product obtained on admixing in an inert hydrocarbon solvent, phenyl magnesium aluminum triisobutylphenyl with titanium tetrachloride in a molar ratio of 0.3 to 10.

References Cited in the file of this patent

UNITED STATES PATENTS

| | | |
|---|---|---|
| 2,721,189 | Anderson | Oct. 18, 1955 |
| 2,822,357 | Brebner | Feb. 4, 1958 |